(12) United States Patent
Lochocki, Jr. et al.

(10) Patent No.: US 9,316,308 B2
(45) Date of Patent: Apr. 19, 2016

(54) DETECTION OF AN EXHAUSTING CLUTCH IN A NEUTRAL IDLE-EQUIPPED TRANSMISSION

(71) Applicant: GM GLOBAL TECHNOLOGY OPERATIONS LLC, Detroit, MI (US)

(72) Inventors: Ronald F. Lochocki, Jr., Ypsilanti, MI (US); Sindu Sebastian, Raleigh, NC (US); Min K. Kim, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 14/517,259

(22) Filed: Oct. 17, 2014

(65) Prior Publication Data

US 2015/0039196 A1 Feb. 5, 2015

Related U.S. Application Data

(63) Continuation of application No. 13/449,825, filed on Apr. 18, 2012, now Pat. No. 8,935,066.

(51) Int. Cl.
| | |
|---|---|
| *G06F 7/00* | (2006.01) |
| *G06F 17/00* | (2006.01) |
| *G06F 19/00* | (2011.01) |
| *F16H 61/02* | (2006.01) |
| *B60W 10/02* | (2006.01) |
| *B60W 10/11* | (2012.01) |
| *F16H 61/12* | (2010.01) |
| *F16H 61/20* | (2006.01) |

(52) U.S. Cl.
CPC ........... *F16H 61/0204* (2013.01); *B60W 10/02* (2013.01); *B60W 10/11* (2013.01); *F16H 61/12* (2013.01); *F16H 61/20* (2013.01); *F16H 2061/1208* (2013.01); *F16H 2061/207* (2013.01)

(58) Field of Classification Search
USPC .................................................. 701/1, 51–70
See application file for complete search history.

(56) References Cited

U.S. PATENT DOCUMENTS

| | | | |
|---|---|---|---|
| 6,123,645 | A | 9/2000 | Hopper |
| 7,509,202 | B2 | 3/2009 | Scelers |
| 8,620,544 | B2 | 12/2013 | Lochocki, Jr. et al. |

FOREIGN PATENT DOCUMENTS

JP  2003003893 A  1/2003

*Primary Examiner* — Bhavesh V Amin
(74) *Attorney, Agent, or Firm* — Quinn Law Group, PLLC

(57) ABSTRACT

A transmission assembly for a vehicle includes a transmission and a controller. The transmission includes an input member, at least one clutch and gear set, and an output member. The input member receives an input torque from an engine. The output member receives an output torque from the clutch and gear set(s). The clutch and gear set(s) connect to the input member and establish a plurality of operating states including a neutral idle (NI) state. A designated NI clutch is selectively actuated to enter the NI state when the transmission is in a drive state and the vehicle is stationary. The controller calculates a reference slip error as a function of engine and turbine speed, and detects when the designated NI clutch is exhausting fluid while operating in the NI state using a function of the reference slip error. A control action executes when the exhausting NI clutch is detected.

18 Claims, 3 Drawing Sheets

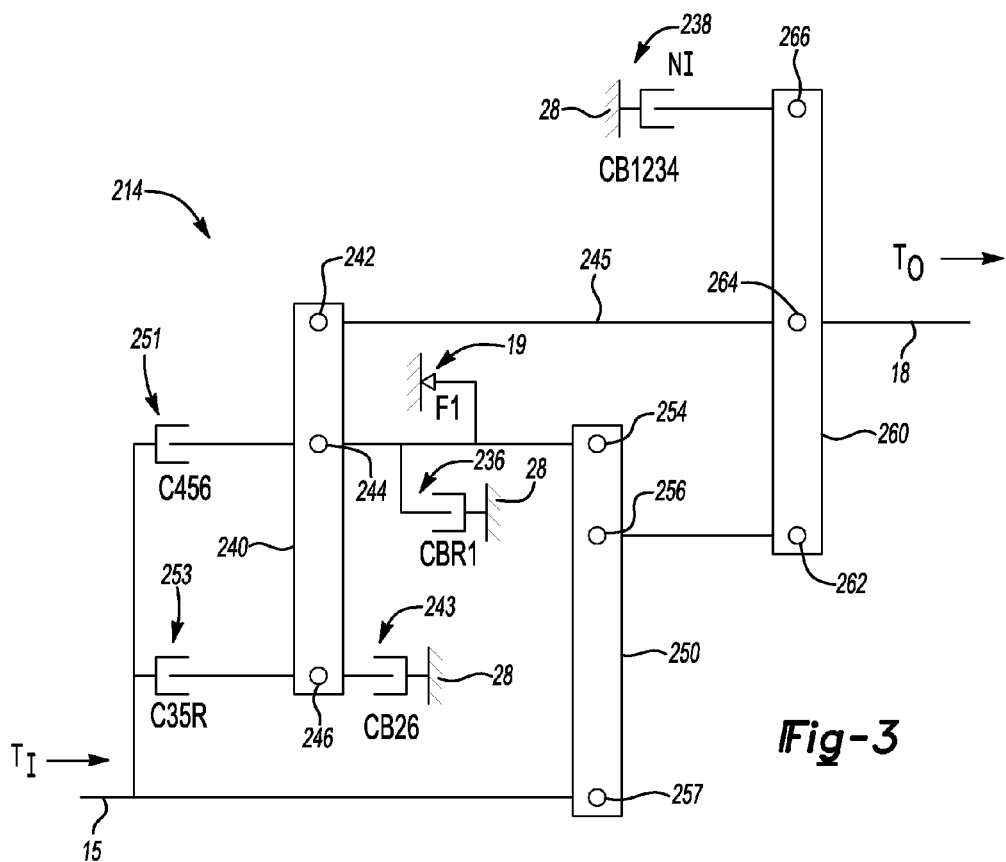
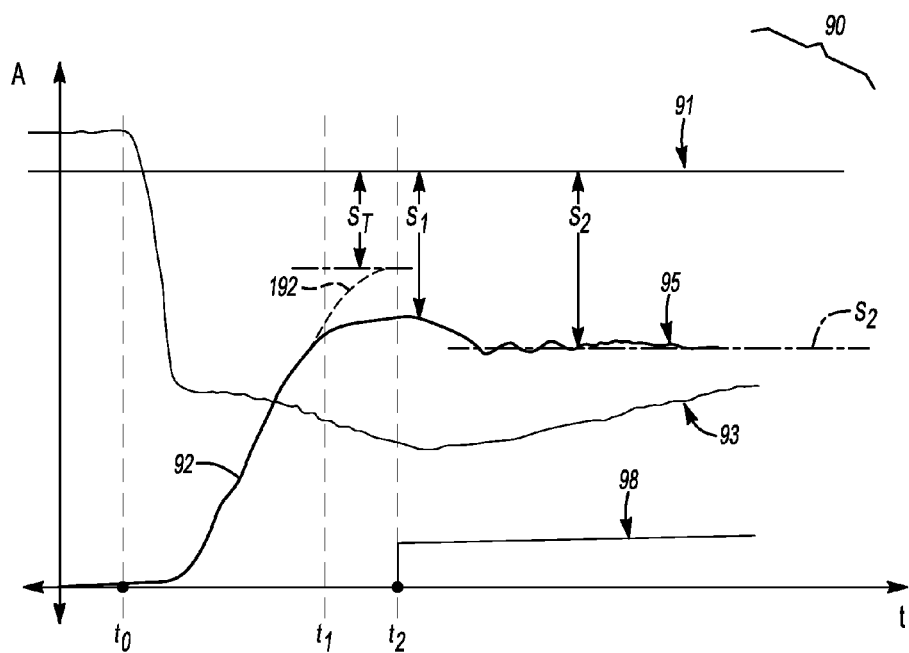

DETECTION OF AN EXHAUSTING CLUTCH IN A NEUTRAL IDLE-EQUIPPED TRANSMISSION

CROSS-REFERENCE TO RELATED APPLICATIONS

This application is a continuation of U.S. patent application Ser. No. 13/449,825, filed Apr. 18, 2012, which is hereby incorporated by reference in its entirety.

TECHNICAL FIELD

The present disclosure relates to the detection of an exhausting clutch in a transmission having a neutral idle state.

BACKGROUND

Vehicle transmissions are designed to transmit torque from an engine or another prime mover to a set of drive wheels. An output shaft of the prime mover is selectively connected to or disconnected from a transmission input shaft depending upon the desired transmission operating state. In an automatic transmission, this connection to the transmission is provided automatically via a hydrodynamic torque converter.

The design of a conventional torque converter allows an increasing amount of slip to occur across the torque converter as vehicle speed decreases. A maximum slip level is ultimately reached when the vehicle speed reaches zero. The variable slip capability provided by a torque converter allows the engine or other prime mover to continue to rotate while idling in certain transmission settings or states, for instance in park (P) or neutral (N). In some vehicle designs, an additional transmission state is enabled when the transmission is set to drive (D) while the vehicle is at a standstill. Hydraulic neutral while in a drive state is commonly referred to as neutral idle (NI).

SUMMARY

A transmission assembly is disclosed herein for a vehicle having an engine and a torque converter having a turbine. The transmission assembly includes a transmission and a controller. The transmission includes an input member configured to receive an input torque from the engine, at least one clutch and gear set, and an output member that receives an output torque from the at least one clutch and gear set for propelling the vehicle. The clutch and gear set(s) establish a plurality of operating states of the transmission including a neutral idle (NI) state, and includes a designated NI clutch that is selectively actuated to enter the NI state when the transmission is in a drive state and the vehicle is stationary. The controller is configured to calculate a reference slip error as a function of a speed of the engine and a speed of the turbine, detect when the designated NI clutch is actively exhausting, i.e., a process of releasing or purging clutch apply fluid from a clutch apply cavity as is well known in the art, while operating in the NI state using the reference slip error, and execute a control action with respect to the transmission when the designated NI clutch is detected as exhausting fluid.

In another embodiment, the transmission assembly includes a plurality of rotating clutches and a plurality of braking clutches, with the plurality of braking clutches including a designated neutral idle (NI) clutch. The transmission assembly further includes at least three gear sets configured, via actuation of at least some of the clutches, to establish a plurality of different operating states of the transmission, including an NI state that is entered when the transmission is in a drive state and the vehicle is stationary. The controller is configured as set forth above.

The controller of either embodiment may be configured to determine a clutch pressure of the designated NI clutch and to detect when the designated NI clutch is exhausting fluid as a function of the determined clutch pressure and the calculated reference slip error.

In an 8-speed embodiment of the transmission, the plurality of operating states includes $1^{st}$, $2^{nd}$, $7^{th}$, $8^{th}$, and reverse gear. The designated NI clutch is engaged in each of the $1^{st}$, $2^{nd}$, $7^{th}$, $8^{th}$, and reverse gears.

In a 6-speed embodiment of the transmission, the plurality of operating states includes $1^{st}$, $2^{nd}$, $3^{rd}$, and $4^{th}$ gear and the designated NI clutch is engaged in each of the $1^{st}$, $2^{nd}$, $3^{rd}$, and $4^{th}$ gears.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 3 is a schematic lever diagram of an example 6-speed transmission usable with the vehicle shown in FIG. 1.

FIG. 4 is a graphical illustration of various transmission control parameters used for detecting an exhausting clutch in the vehicle shown in FIG. 1.

DETAILED DESCRIPTION

Figure 1:
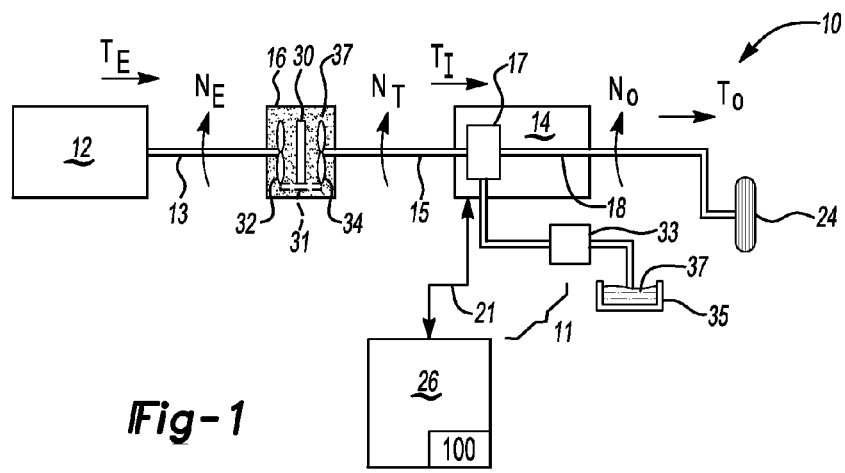
FIG. 1 is a schematic illustration of an example vehicle having a transmission with a neutral idle (NI) state and a controller configured to detect an exhausting transmission clutch as set forth herein.

Referring to the drawings, wherein like reference numbers correspond to like or similar components throughout the several figures, an example vehicle 10 is shown schematically in FIG. 1. The vehicle 10 includes an automatic transmission 14 having various modes or states, including but not limited to a neutral idle state (NI) state as described herein. A controller 26 is in communication with the transmission 14 via a communication channel (double headed arrow 21) to form a transmission assembly 11. The controller 26 is configured to execute instructions embodying the present method 100, an example of which is described below with reference to FIG. 6 with additional reference to FIGS. 4 and 5, to thereby detect an exhausting clutch while operating in the NI state, and for executing a suitable control action(s) in response to detection of the exhausting clutch.

As is well understood in the art, in the NI state a transmission such as the transmission 14 of FIG. 1 is placed in drive (D) while electro-hydraulic clutch pressure regulation valves (not shown) reduce pressure on a designated NI clutch. This places the transmission 14 into a partially-loaded "hydraulic neutral" state. If torque converter slip is low enough such that the load a turbine 34 exerts on the pump 32 is reduced, then the load on the engine 12 is reduced. The reduction in engine load manifests itself as reduced idle fuel consumption, as well as reduced noise, vibration, and harshness (NVH) of the powertrain. The NI state is therefore distinct from park/neutral (P/N). In P/N, the various clutches of the transmission 14 are open, i.e., not pressurized. In the NI state, a designated NI clutch is closed and pressurized just above the return spring pressure level to control slip across the torque converter 16.

The vehicle 10 further includes an internal combustion engine 12 or other suitable prime mover. The engine 12 is selectively and/or variably connected to the transmission 14 via the torque converter 16. The engine 12 has an output shaft 13 which rotates at an engine speed ($N_E$). The transmission 14 in turn has an input shaft 15 which rotates at a speed ($N_T$). Transfer of an input torque ($T_I$) to the transmission 14 occurs through the torque converter 16.

The transmission 14 shown in FIG. 1 also has an output shaft 18, which ultimately conveys a transmission output torque ($T_O$) from one or more clutch and gear sets 17 to thereby propel the vehicle 10 via a set of drive wheels 24. The output shaft 18 ultimately rotates at an output speed ($N_O$). The clutch and gear sets 17 can be selectively actuated through electro-hydraulic controls powered by fluid 37 that is circulated by a pump 33 from a fluid reservoir 35.

Figure 6:
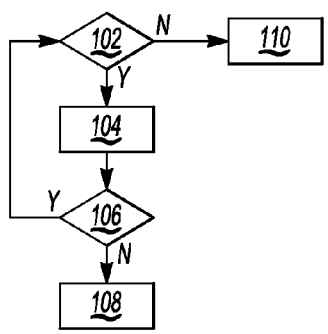
FIG. 6 is a flow chart describing an example method for detecting an exhausting clutch using the parameters shown in FIG. 5.

The engine 12 and the torque converter 16 of FIG. 1 are in communication with the controller 26. The controller 26 may be configured as a microprocessor-based device having such common elements as a microprocessor or CPU, memory including but not limited to: read only memory (ROM), random access memory (RAM), electrically-programmable read-only memory (EPROM), etc., and circuitry including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry. The controller 26 is thus configured to selectively execute instructions embodying the present method 100, an example of which is shown in FIG. 6 and described below.

Still referring to FIG. 1, the torque converter 16 may be embodied as a hydrodynamic torque converter of the type known in the art, i.e., having a stator 30, pump 32, and turbine 34. A lockup clutch 31 may be used to selectively lock the pump 32 to the turbine 34 above a threshold lockup speed, as will be understood by those of ordinary skill in the art. Within the torque converter 16, the turbine 34 is driven by fluid 37, with the turbine 34 in turn connected to the input shaft 15 of the transmission 14. Thus, rotation of the turbine 34 ultimately rotates the input shaft 15 of the transmission 14 at a rate or speed ($N_T$) that is less than or equal to the engine speed ($N_E$), with viscous drag or friction losses within the clutch and gear sets 17 and other connected portions of the transmission 14 tending to reduce the speed ($N_T$) to a level less than that of engine speed ($N_E$).

The transmission 14 can be configured as a multi-speed transmission suitable for establishing a plurality of transmission operating modes or states, including reverse (R), neutral (N), Neutral idle (NI), and various forward drive states (D), as well as an optional overdrive state. Example embodiments of the transmission 14 are described below with reference to FIGS. 2 and 3. Regardless of the actual configuration of the transmission 14, the transmission 14 has a designated NI clutch which is used to enter the NI state and thereby reduce idle fuel consumption whenever the transmission 14 is set to drive (D) and the vehicle 10 is caused to remain stationary, e.g., by braking.

The level of slip across the torque converter 16 is referred to herein for clarity as the TC Slip, with the value of TC Slip being equal to the difference between engine and turbine speed, i.e., [$N_E - N_T$]. That is, when the TCC 31 within the torque converter 16 is fully locked, $N_E = N_T$, and therefore TC Slip is zero. Absent lockup of the TCC 31, or when the TCC 31 is not used as part of the torque converter 16, there will be at least some level of TC Slip due to viscous drag or friction from the clutch and gear sets 17 of the transmission 14. The TC Slip will vary from unit to unit (build to build) in the same vehicle model.

As is well understood in the art, vehicles of a given design may not achieve an actual TC slip that approaches the typical vehicle's natural minimum slip. This may occur due to an arbitrarily high safety factor that does not achieve optimal TC slip for a given temperature. The unique TC slip level can differ between individual vehicles of a common model or design based on that vehicle's unique performance and build history, use, and wear. Conventional methods tend to enforce an arbitrarily high slip level across all vehicles of a given design based on the behavior of a representative calibration vehicle or vehicles. The present approach can be used to fine tune the performance of a vehicle over time, and/or for maintenance purposes, as set forth below with reference to FIGS. 4-6.

Figure 2:
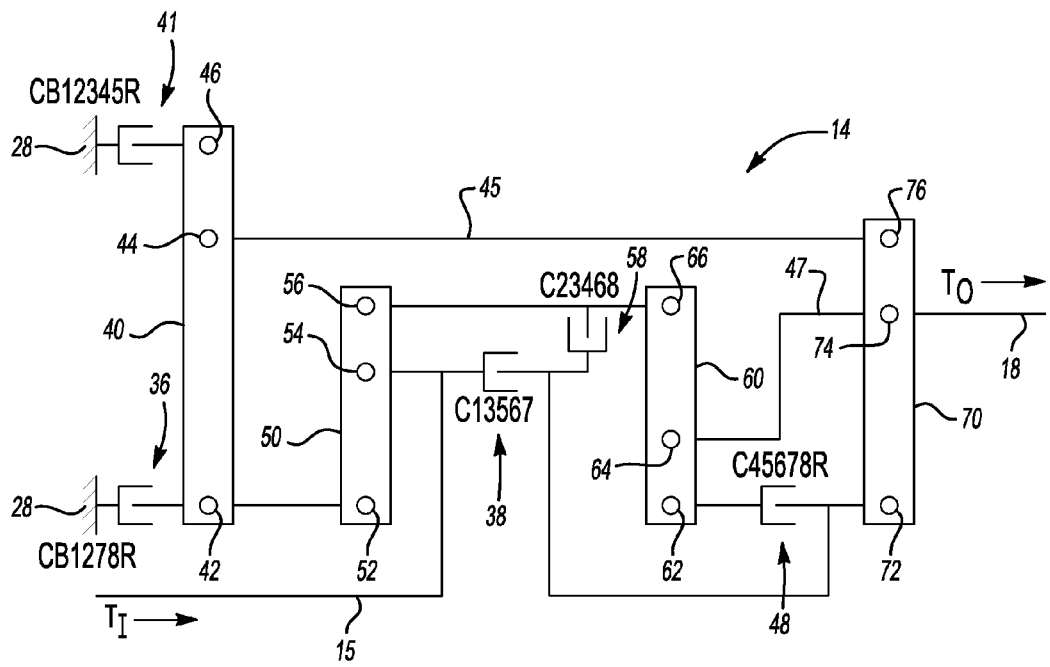
FIG. 2 is a schematic lever diagram for an example 8-speed transmission having a designated NI clutch that may be used with the vehicle shown in FIG. 1.

Referring to FIGS. 2 and 3, two example transmissions 14 and 214 are shown. Each has a designated NI clutch. The example transmission 14 of FIG. 2 is an 8-speed transmission, while FIG. 3 illustrates an example front wheel drive (FWD) 6-speed transmission. Within each example transmission 14 and 214, the reason a particular clutch is designated as the NI clutch is typically determined by (a) whether the clutch is on in $1^{st}$ and $2^{nd}$ gear; (b) whether cooling oil can be supplied to the clutch; and (c) where the gearbox naturally slips. Thus, while certain clutches are indicated in FIGS. 2 and 3 as being designated NI clutches, the actual NI clutch can vary with the transmission design.

The example 8-speed transmission 14 of FIG. 2 has a plurality of gear sets and clutches, i.e., the clutches and gears 17 as shown schematically in FIG. 1. The transmission 14 may include a first, second, third, and fourth gear sets 40, 50, 60, and 70. Braking clutches may include clutches 41 (CB12345R) and 36 (CB1278R), with clutch 36 used in this example as the designated NI clutch. Rotating clutches 38 (C13567), 58 (C23468), and 48 (C45678R) may also be used as part of the transmission 14. As used hereinafter, the above nomenclature, for example (C12567), refers to a clutch (C) engaged in the indicated gear states, i.e., first (1), second (2), reverse (R), etc. The letter (B) indicates a non-rotating clutch, i.e., a brake.

The first gear set 40 may include nodes 42, 44, and 46. Nodes 42, 44, and 46 may be a sun gear, a carrier gear, and a ring gear, respectively, in a non-limiting example embodiment. Node 46 may be selectively connected to stationary member 28 via clutch 41. Node 42 may be selectively connected to stationary member 28 via clutch 36.

The second gear set 50 may include nodes 52, 54, and 56, which in a particular embodiment may be a sun gear, a carrier gear, and ring gear, respectively. Node 52 maybe directly connected to node 42 of gear set 40. Node 54 is connected to an input side of rotating clutch 38, as is the transmission input shaft 15 with its input torque ($T_I$). Node 56 is connected to the third gear set 60, which may include nodes 62, 64, and 66. In a particular embodiment, nodes 62, 64, and 66 may be a sun gear, a carrier gear, and ring gear, respectively. Node 66 may be directly connected to node 56 of the second gear set 50, and selectively connected to node 54 by clutches 58 and 38.

The fourth gear set 70 may include nodes 72, 74, and 76, which may be a sun gear, a carrier gear, and a ring gear, respectively. Node 76 is directly connected to node 44 via an interconnecting member 45. Node 74 is directly connected to the transmission output shaft 18, and is also directly connected to node 64 of the third gear set 60 via another interconnecting member 47. Node 72 is selectively connected to node 62 via clutch 48.

In the NI state, use of a calibrated slip curve designed for park/neutral may be less than optimal. In P/N, the clutch 36 is locked, while in NI the same clutch 36 is slipping. Likewise, clutch 38 in P/N is open, while in NI the same clutch 38 is locked. As a result, there is a greater likelihood that the calibrated slip curve used for controlling P/N in the 8-speed transmission 14 of FIG. 2 will be less than optimal when used in NI.

Referring to FIG. 3, another transmission 214 is configured as an example front-wheel drive 6-speed transmission. The transmission 214 may include first, second, and third gear sets 240, 250, and 260, respectively, braking clutches 243 (CB26), 236 (CBR1), and 238 (CB1234), and rotating clutches 253 (C35R) and 251 (C456). A free-wheeling element 19 (F1) may be used to prevent rotation with respect to node 254 of the second gear set 250.

The first gear set 240 may include nodes 242, 244, and 246, which in one possible embodiment may be a ring gear, a carrier member, and a sun gear, respectively. The input shaft 15 carrying the input torque ($T_I$) may be selectively connected to nodes 244 and 246 via the clutches 251 and 253, respectively. Node 242 is directly connected to node 264 of the third gear set 260 via an interconnecting member 245.

The second gear set 250 includes nodes 254, 256, and 257, which in one possible embodiment may be configured as a ring gear, a carrier gear, and a sun gear, respectively. Node 257 is directly connected to the transmission input shaft 15. Node 254 is connected to node 244 of the first gear set 240. The free-wheeling element 19 (F1) may be used to connect to the stationary member 28 to allow rotation with respect to node 254 in only one rotational direction.

The third gear set 260 includes nodes 262, 264, and 266, which may be embodied as a ring gear, a carrier gear, and a sun gear, respectively. Node 266 is selectively connected to stationary member 28 via clutch 238 (CB1234), which may function as the designated NI clutch. Node 264 is connected to node 242 of the first gear set 240 and to the output shaft 18 of transmission 14. Node 262 is directly connected to node 256 of the second gear set 250.

Referring to FIG. 4, a set of performance curves 90 is shown for the example transmission 14 of FIG. 1. Engine speed, which is constant, is represented by line 91. Clutch pressure (trace 93) for the designated NI clutch drops after to as shown, i.e., just after the transmission 14 enters the NI state. Turbine speed (trace 92) increases after to. If certain entry conditions are satisfied between $t_1$ and $t_2$, a software flag 98 turns on at $t_2$. When the software flag 98 is active, the controller 26 of FIG. 1 records an amount of slip at a specific measured temperature as a point on a calibrated slip curve. Depending on the recorded values, the controller 26 may take remedial action by executing one or more control actions with respect to the transmission 14.

A targeted slip ($S_T$) is provided for the vehicle 10 via a calibrated slip curve in the conventional manner. See for example the slip curve 84 of FIG. 5. The turbine speed (trace 92) of FIG. 4 would have to have the phantom trajectory 192 in order to reach this slip target. However, the actual turbine speed trajectory is insufficient for reaching this slip target, and thus an appreciable amount of slip error exists. For example, if the slip ($S_1$) is 77 RPM with respect to engine speed (line 91), with a target slip ($S_T$) of 70 RPM, the slip error is (77 RPM−70 RPM)=7 RPM. Because the target slip cannot be achieved, after $t_2$ turbine speed (trace 92) will be controlled in region 95 with a higher slip level $S_2$, e.g., 87 RPM.

Predetermined entry conditions to the present method 100 are satisfied if, when operating in the NI state, clutch pressure (trace 93) to a designated NI clutch continues decreasing at a calibrated rate while reference slip error does not change for a calibrated duration, i.e., $t_1$ to $t_2$. This condition indicates that the target slip ($S_T$) is not achievable in that particular vehicle. As a result, the controller 26 of FIG. 1 turns on the software flag 98 at $t_2$ and begins recording the actual slip profile.

Figure 5:
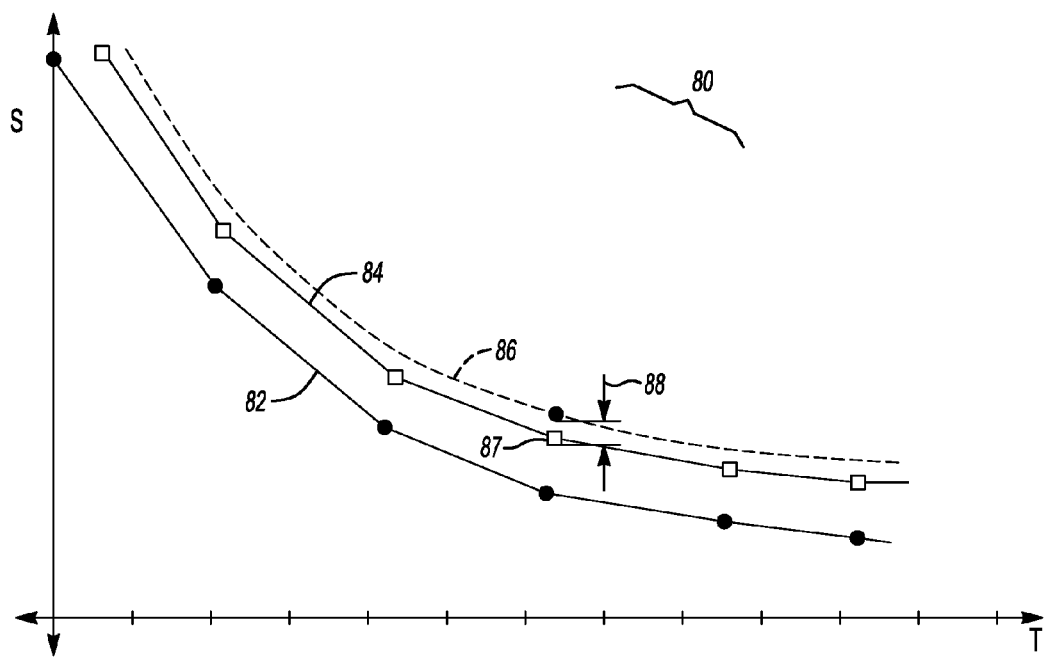
FIG. 5 is a schematic illustration of a set of slip curves used in controlling the vehicle of FIG. 1.

With reference to FIG. 5, an example set of calibrated slip curves 80 includes a first calibrated slip curve 82 and a second calibrated slip curve 84, wherein an amount of slip (S) is plotted on the vertical axis and temperature (T) is plotted on the horizontal axis. The first calibrated slip curve 82 is a calibrated reference torque converter slip curve for use in slip control of the transmission 14 of FIG. 1 during the park/neutral (P/N) state. A calibrated safety margin of approximately 10 RPM to 20 RPM may separate the calibrated slip curve 82 from the second calibrated slip curve 84, with the second calibrated slip curve 84 being the actual control curve for use during the P/N state.

The second calibrated slip curve 84 is also typically the default trace for slip control during the NI state. However, as noted above the differences in clutch control of the NI state relative to the P/N state, particularly in 8-speed or higher transmissions, means that controlling slip to the P/N slip curve, i.e., the second calibrated slip curve 84, may not always be ideal. A third calibrated slip trace 86 as shown in phantom may be required for NI, with the difference 88 between the curves 84 and 86 being the amount of adjustment potentially required to the second calibrated slip curve 84.

By detecting an exhausting clutch, a condition which corresponds to point 87, the controller 26 of FIG. 1 can determine whether there is debris in the transmission affecting the balance of torque on the lever, or whether the present safety margin between traces 82 and 84 is less than it should be, i.e., whether and to what extent the second calibrated slip curve 84 should be adjusted, in whole or in part, in order to optimize the shift feel in the NI state. Exiting the NI state with an exhausting designated NI clutch could result in a perceptible shift bump. Use of the present method 100 can therefore optimize shift feel in a vehicle having NI capability.

Referring to FIG. 6, an example method 100 for using the controller 26 of FIG. 1 to detect an exhausting clutch begins with step 102. At step 102, the controller 26 determines whether the vehicle 10 has coasted to a stop and the transmission 14 has entered the NI state. The method 100 proceeds to step 104 if the NI state has been entered. Otherwise, the method 100 proceeds to step 110.

At step 104, while operating in the NI state the slip across the torque converter 16 is periodically monitored by the controller 26. The controller 26 may temporarily record the slip (S) and temperature (T) shown in the example set of traces 80 of FIG. 5 described above. Thereafter, the method 100 proceeds to step 106.

At step 106, the controller 26 of FIG. 1 determines whether predetermined entry condition is satisfied in which pressure to the NI clutch is decreasing but the reference slip error does not react to the decrease. This entry condition indicates that the target slip is not achievable in the vehicle. Step 106 may entail calculating the rate of change of regulating pressure for the calibrated duration $t_1$ to $t_2$ and checking for decreasing, increasing, or constant trends. At the same time, the reference slip error rate is calculated for the same calibrated time based on the difference between the targeted slip and the current slip across the torque converter 16 of FIG. 1. If a negative trend in regulating pressure exceeds an allowable trend, without impact on the reference slip error, then the software flag 98 of FIG. 4 is activated by the controller 26 of FIG. 1. The method 100 then proceeds to step 108.

At step 108, the controller 26 executes a suitable control action or multiple such actions. Various embodiments exist for step 108. For instance, the controller 26 may determine a fixed amount of adjustment to make to the entirety of the second calibrated slip curve 84 of FIG. 5. That is, the entire curve 84 may be shifted upward by a fixed amount so that the exhausting clutch state at point 87 of FIG. 5 is avoided. This may be achieved by increasing the safety margin between traces 84 and 86, or by otherwise shifting the position of the second calibrated slip curve 84 of FIG. 5 upward to the position of the third curve 86.

Other control actions may be executed such as setting a diagnostic code in memory of the controller 26. It is recognized herein that accumulated friction material or other debris in the transmission 14 may change the natural slip curve of a given vehicle over time. Therefore, the detected exhausting clutch may be indicative of accumulated debris, with a suitable control action being the signaling of the possible need for maintenance and/or inspection of the transmission 14.

At step 110, having determined at step 102 that the transmission 14 is not presently operating in the NI state, the controller 26 controls the transmission 14 according to the requirements of the present operating state.

By using a controller 26 configured to execute the method 100, an exhausting clutch may be readily detected and corrected when operating in the NI state. The present method 100 allows automatic relearning of the natural slip curve of the vehicle 10 of FIG. 1, which can vary over the life of the vehicle 10, to optimize the feel of NI. Likewise, use of the method 100 provides robust and consistent NI control over the life of the vehicle 10, as well as insight into possible oil contamination that may manifest itself as changing slip.

While the best modes for carrying out the disclosure have been described in detail, those familiar with the art to which this invention relates will recognize various alternative designs and embodiments for practicing the disclosure within the scope of the appended claims.

The invention claimed is:

1. A transmission assembly for a vehicle having an engine and a torque converter having a turbine, the transmission assembly comprising:
　a transmission having:
　　an input member configured to receive an input torque from the engine;
　　at least one clutch and gear set operable to establish a plurality of operating states of the transmission including a neutral idle (NI) state, wherein the at least one clutch and gear set includes a designated NI clutch that is selectively actuated to enter the NI state when the transmission is in a drive state and the vehicle is stationary;
　　an output member that receives an output torque from the at least one clutch and gear set for propelling the vehicle; and
　a controller configured to:
　　calculate a reference slip error as a function of a speed of the engine and a speed of the turbine;
　　detect when the designated NI clutch is exhausting fluid while operating in the NI state using the reference slip error; and
　　execute a control action with respect to the transmission when the designated NI clutch is detected as exhausting fluid.

2. The transmission assembly of claim 1, wherein the controller is configured to determine a clutch pressure of the designated NI clutch and to detect when the designated NI clutch is exhausting fluid as a function of the determined clutch pressure and the calculated reference slip error.

3. The transmission assembly of claim 2, wherein the controller is configured to determine when the calculated reference slip error is stable while the determined clutch pressure of the designated NI clutch is decreasing, and to thereby detect when the designated NI clutch is exhausting fluid.

4. The transmission assembly of claim 1, wherein the designated NI clutch is a braking clutch.

5. The transmission assembly of claim 4, wherein the transmission is an 8-speed transmission.

6. The transmission assembly of claim 5, wherein the plurality of operating states includes $1^{st}$, $2^{nd}$, $7^{th}$, $8^{th}$, and reverse gear and the designated NI clutch is engaged in each of the $1^{st}$, $2^{nd}$, $7^{th}$, $8^{th}$, and reverse gears.

7. The transmission assembly of claim 4, wherein the transmission is a 6-speed transmission.

8. The transmission assembly of claim 7, wherein the plurality of operating states includes $1^{st}$, $2^{nd}$, $3^{rd}$, and $4^{th}$ gear and the designated NI clutch is engaged in each of the $1^{st}$, $2^{nd}$, $3^{rd}$, and $4^{th}$ gears.

9. The transmission assembly of claim 1, wherein the controller is programmed with a calibrated torque converter slip profile of the vehicle that is used to control slip across the torque converter in the NI state and in the park/neutral (P/N) state, and wherein the control action includes:
　automatically adjusting the calibrated torque converter slip profile; and
　controlling the transmission in a subsequent NI state using the adjusted slip curve.

10. The transmission assembly of claim 1, wherein the control action includes setting a diagnostic code in memory of the controller.

11. The transmission assembly of claim 1, wherein the control action includes adjusting only a portion of a calibrated torque converter slip curve, and then controlling the transmission in a subsequent NI state using the slip curve with the adjusted portion.

12. A transmission assembly for a vehicle having an engine and a torque converter having a turbine, the transmission comprising:
　a transmission having:
　　a plurality of rotating clutches and a plurality of braking clutches, wherein the plurality of braking clutches includes a designated neutral idle (NI) clutch;
　　at least three gear sets that are configured, via actuation of at least some of the clutches, to establish a plurality of different operating states of the transmission, including an NI state that is entered when the transmission is in a drive state and the vehicle is stationary;
　　an output member that receives an output torque from one of the plurality of gear sets for propelling the vehicle; and
　a controller configured to:
　　calculate a reference slip error as a function of a speed of the engine and a speed of the turbine;
　　detect when the designated NI clutch is exhausting fluid while operating in the NI state using a function of the reference slip error; and
　　execute a control action with respect to the transmission when the NI clutch is detected as exhausting fluid.

13. The transmission assembly of claim 11, wherein the controller is configured to determine a clutch pressure of the designated NI clutch and to detect when the designated NI clutch is exhausting fluid as a function of the determined clutch pressure and the calculated reference slip error.

14. The transmission assembly of claim 12, wherein the controller is configured to determine when the calculated reference slip error is stable while the determined clutch pressure of the designated NI clutch is decreasing, and thereby detect when the designated NI clutch is exhausting fluid.

15. The transmission assembly of claim 12, wherein the designated NI clutch and the output member are connected to different nodes of the same gear set of the plurality of gear sets.

16. The transmission assembly of claim 15, wherein the transmission is a 6-speed transmission and the designated NI clutch is further engaged in $1^{st}$, $2^{nd}$, $3^{rd}$, and $4^{th}$ gear.

17. The transmission assembly of claim 12, wherein the designated NI clutch and the output member are connected to different gear sets of the plurality of gear sets.

18. The transmission assembly of claim 16, wherein the transmission is an 8-speed transmission and the designated NI clutch is further engaged in $1^{st}$, $2^{nd}$, $7^{th}$, $8^{th}$, and reverse gear.

\* \* \* \* \*